(12) United States Patent
Huff et al.

(10) Patent No.: US 8,904,158 B2
(45) Date of Patent: Dec. 2, 2014

(54) STORAGE SYSTEM WITH BOOT APPLIANCE FOR IMPROVING RELIABILITY/AVAILABILITY/SERVICEABILITY IN HIGH DENSITY SERVER ENVIRONMENTS

(75) Inventors: Gregory L. Huff, The Woodlands, TX (US); Timothy E. Hoglund, Colorado Springs, CO (US); Brad D. Besmer, Colorado Springs, CO (US); Mark J. Jander, Colorado Springs, CO (US); Edward F. Marchand, Fort Collins, CO (US); Jason C. McGinley, Castle Rock, CO (US)

(73) Assignee: LSI Corporation, San Jose, CA (US)

( * ) Notice: Subject to any disclaimer, the term of this patent is extended or adjusted under 35 U.S.C. 154(b) by 377 days.

(21) Appl. No.: 13/309,662

(22) Filed: Dec. 2, 2011

(65) Prior Publication Data

US 2013/0061029 A1 Mar. 7, 2013

Related U.S. Application Data

(60) Provisional application No. 61/530,510, filed on Sep. 2, 2011.

(51) Int. Cl.
*G06F 9/00* (2006.01)
*G06F 9/44* (2006.01)
*G06F 9/24* (2006.01)

(52) U.S. Cl.
CPC ............. *G06F 9/4408* (2013.01); *G06F 9/24* (2013.01)

USPC ............................................................. 713/1

(58) Field of Classification Search
CPC ................ G06F 9/44; G06F 9/24; G06F 9/00
USPC ........................................................ 713/1, 2
See application file for complete search history.

(56) References Cited

U.S. PATENT DOCUMENTS

| 6,895,480 | B2 | 5/2005 | Heil | |
| 7,246,221 | B1* | 7/2007 | Soltis et al. | 713/1 |
| 8,046,572 | B2* | 10/2011 | Ota et al. | 713/2 |
| 2009/0216866 | A1* | 8/2009 | Lu et al. | 709/222 |
| 2009/0248784 | A1* | 10/2009 | Cheston et al. | 709/201 |
| 2010/0287365 | A1 | 11/2010 | Watkins et al. | |

* cited by examiner

*Primary Examiner* — Mohammed Rehman
(74) *Attorney, Agent, or Firm* — Suiter Swantz pc llo

(57) ABSTRACT

The present invention is directed to a boot appliance for a data storage system. The boot appliance is a self-contained, preconfigured device that serves as a boot device for multiple servers. The boot appliance contains multiple hard drives which are configured into one or more RAID volumes. Each volume is divided into multiple partitions, with each partition serving as the boot drive for any server connected to it. The boot appliance provides its own environmental controls and Ethernet connection which may be used for providing alerts regarding the health of the components of the boot appliance and/or data storage system to a monitoring system, such as a network management system. The boot appliance may provide a boot drive and operating system image to multiple servers at the same time.

4 Claims, 2 Drawing Sheets

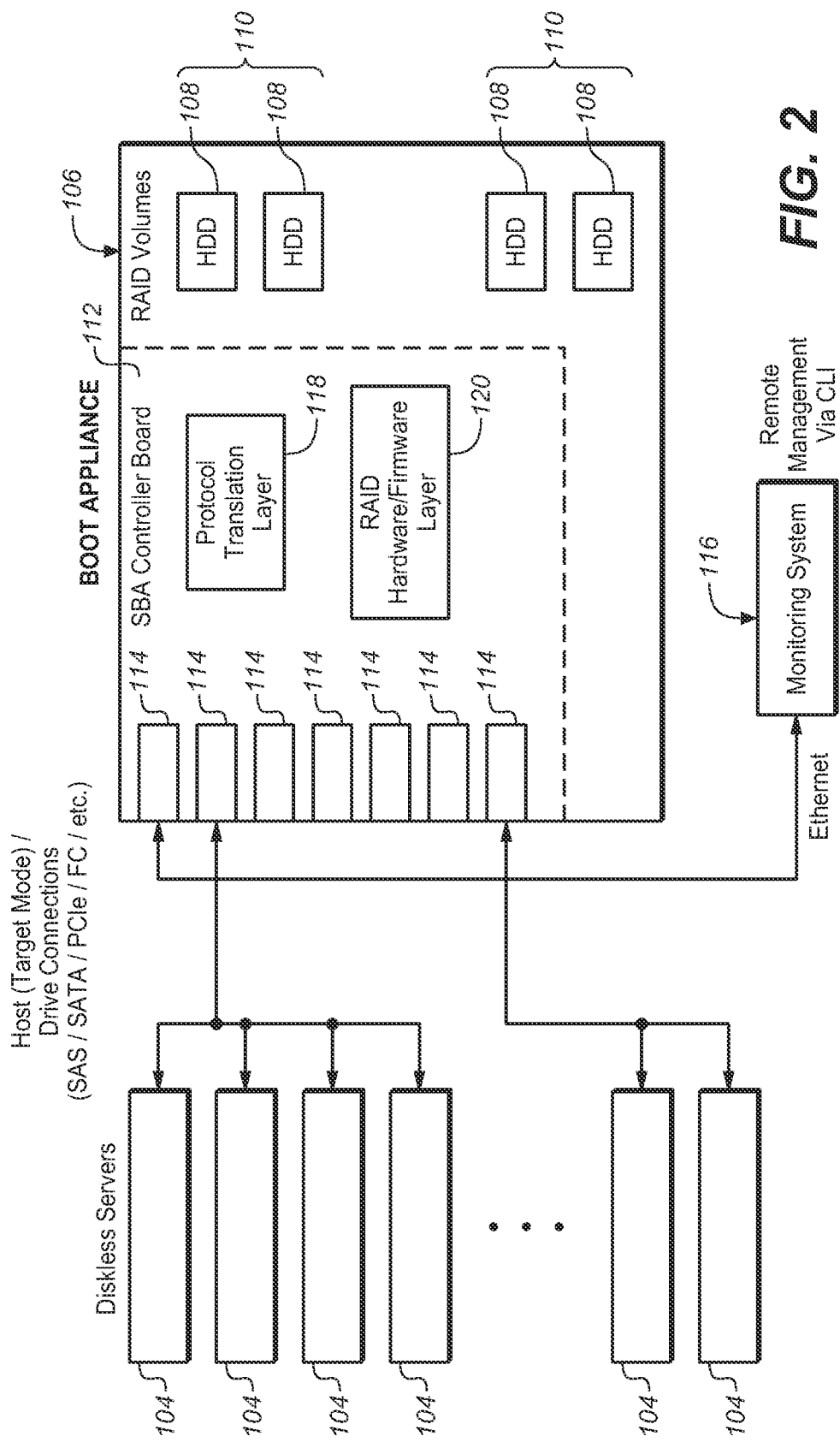

STORAGE SYSTEM WITH BOOT APPLIANCE FOR IMPROVING RELIABILITY/AVAILABILITY/SERVICEABILITY IN HIGH DENSITY SERVER ENVIRONMENTS

CROSS-REFERENCE TO RELATED APPLICATIONS

The present application claims priority under 35 U.S.C. §119(e) to U.S. Provisional Application No. 61/530,510 entitled: Method and Apparatus for Consolidating Boot Drives and Improving Reliability/Availability/Serviceability in High Density Server Environments filed Sep. 2, 2011, which is hereby incorporated by reference in its entirety.

FIELD OF THE INVENTION

The present invention relates to the field of storage systems (ex.—external, internal/Direct-attached storage (DAS); Redundant Array of Inexpensive Disks (RAID); software; enclosures; Network-attached storage (NAS) systems; Storage Area Network (SAN) systems; networks) and particularly, to a method and apparatus for consolidating boot drives and improving reliability/availability/serviceability in high-density server environments.

BACKGROUND OF THE INVENTION

Currently available storage systems may not provide a desired level of performance.

Therefore, it may be desirable to provide a storage system device which addresses the above-referenced shortcomings of currently available solutions.

SUMMARY OF THE INVENTION

Accordingly, an embodiment of the present disclosure is directed to a data storage system, including: a plurality of servers; an enclosure, the enclosure configured for at least substantially containing the plurality of servers; and a boot appliance, the boot appliance being communicatively coupled with the plurality of servers, the boot appliance including a plurality of disk drives, wherein the boot appliance is configured for providing a boot drive and an operating system image to multiple servers included in the plurality of servers.

A further embodiment of the present disclosure is directed to a boot appliance for a data storage system, the boot appliance including: a plurality of disk drives; a controller board, the controller board being communicatively coupled with the plurality of disk drives; a plurality of connectors, the plurality of connectors being connected to the controller board, the plurality of connectors configured for communicatively coupling the boot appliance with a plurality of servers; and a protocol translation layer, the protocol translation layer being connected to the controller board, the protocol translation layer being communicatively coupled with the plurality of connectors, wherein the boot appliance is configured for providing a boot drive and an operating system image to multiple servers included in the plurality of servers.

A still further embodiment of the present disclosure is directed to a boot appliance for a data storage system, the boot appliance including: a plurality of Serial Advanced Technology Attachment (SATA) hard disk drives, the disk drives forming at least one Redundant Array of Inexpensive Disks (RAID) volume, the at least one RAID volume forming multiple partitions; a System Bus Adapter (SBA) controller board, the controller board being communicatively coupled with the plurality of disk drives; a plurality of connectors, the plurality of connectors being connected to the controller board, the plurality of connectors configured for communicatively coupling the boot appliance with a plurality of servers, at least one connector included in the plurality of connectors being configured for connecting the boot appliance, via an Ethernet connection, to a remotely-located monitoring system, the monitoring system being a network management system; a protocol translation layer, the protocol translation layer being connected to the controller board, the protocol translation layer being communicatively coupled with the plurality of connectors; and a hardware/firmware layer, the hardware/firmware layer being connected to the controller board, the hardware/firmware layer being communicatively coupled with the disk drives and the protocol translation layer, wherein the boot appliance is configured for providing a boot drive and an operating system image to multiple servers included in the plurality of servers, each partition included in the multiple partitions being configured for acting as a boot drive for a server included in the plurality of servers which is connected to the RAID volume.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which:

FIG. 2 is a block diagram schematic of a data storage system connected to a remote management system in accordance with exemplary embodiments of the present disclosure.

DETAILED DESCRIPTION OF THE INVENTION

Figure 1:
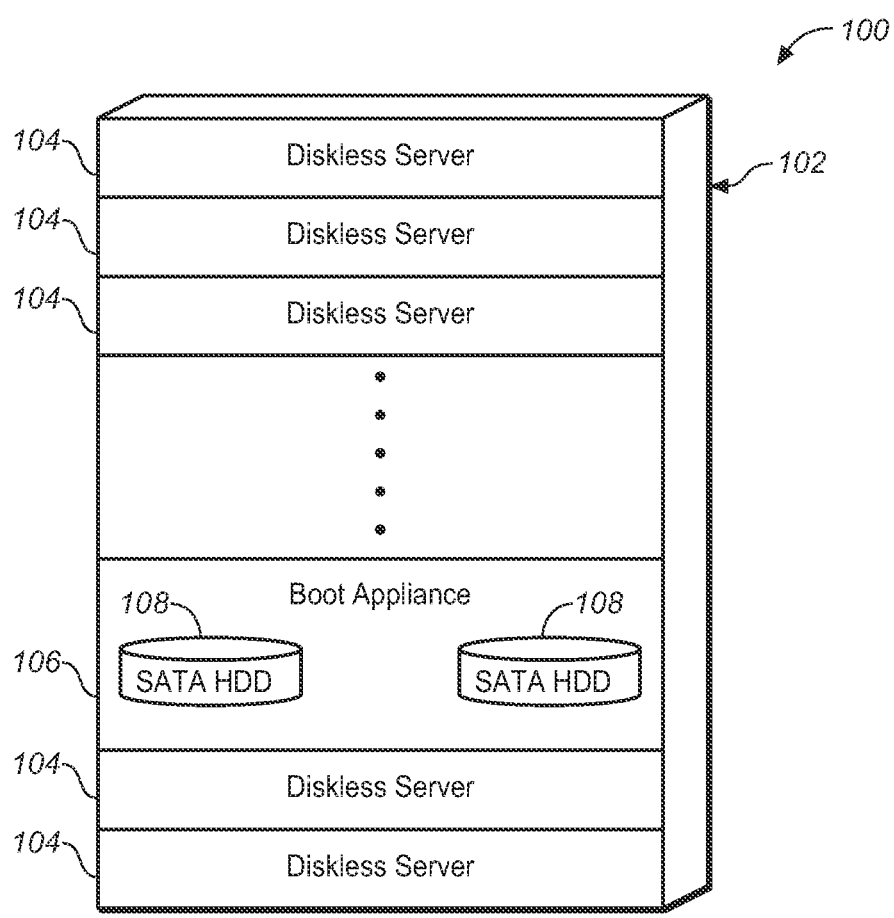
FIG. 1 is a block diagram schematic of a data storage system in accordance with an exemplary embodiment of the present disclosure.

Reference will now be made in detail to the presently preferred embodiments of the invention, examples of which are illustrated in the accompanying drawings.

In many high density server environments today there is an ever-present need for both increased reliability and cost reduction. For example, many mega-data centers today have vast amounts of servers in racks, where each server has its own boot drive. This is terribly inefficient because often, these boot drives only serve as a boot drive for the operating system (OS). In addition, these boot drives typically are Serial Advanced Technology Attachment (SATA) drives due to their lower cost. However, there is a tradeoff when using SATA drives because the SATA drives suffer from high failure rates. This is problematic because each time one of the SATA drives fails, the server will be lost and service will need to be scheduled and performed to fix or replace the failed drive. The result is that the server is also down for the entire time until the drive is fixed or replaced. Further, the need for additional servers in these data centers is growing at a very high rate.

The present disclosure describes a device that is/serves as a boot appliance, which may promote reduced cost without sacrificing reliability. By ensuring that the cost of the boot appliance is less than the sum total of the server boot drives being replaced, the boot appliance of the present disclosure may promote reduced cost without sacrificing reliability. Further, by introducing both Redundant Array of Inexpensive Disks (RAID) 1 (ex.—mirroring) and redundancy to components within the device (ex.—fans, power supplies, etc.), higher reliability can also be achieved. Still further, if something were to fail on the boot appliance of the present disclosure, the system incorporating the boot appliance may be configured so that it continues to run, while alerting the user of the failure. Therefore, service could be scheduled and performed without losing any servers.

Referring to FIGS. 1 and 2, a system in accordance with an embodiment of the present disclosure is shown. In exemplary embodiments, the system 100 may be a data handling system (ex.—a high-density server environment; a data center; a mega-data center; a data storage system). In further embodiments, the system 100 may include an enclosure (ex.—housing; a cabinet) 102 configured for housing multiple servers. In still further embodiments, the system 100 may include a plurality of servers 104 (ex.—disk-less servers). For example, the servers 104 may be physical computers (ex.—hardware systems). In further embodiments, the servers 104 may be connected to (ex.—mounted on; mounted within) the housing 102. For instance, the servers 104 may be configured within and/or supported upon racks of the housing 102.

In exemplary embodiments of the present disclosure, the system 100 may include a boot appliance (ex.—boot device) 106. In further embodiments, the boot appliance 106 may be communicatively coupled with the plurality of servers 104. For instance, the boot appliance 106 may be at least substantially contained within the housing 102, may be supported upon a rack(s) of the housing 102, and may be communicatively coupled with the plurality of servers 104 (which may also be supported upon racks of the housing 102). In still further embodiments, the boot appliance 106 may be a self-contained and pre-configured device which may serve as a boot device for the plurality of servers 104. For instance, the boot appliance 106 may serve as the device from which an operating system (OS) is loaded. Further, the boot appliance 106 may be a device which provides a boot drive (ex.—a disk drive which contains the OS) and an OS image to multiple servers included in the plurality of servers 104 at the same time. For instance, an OS image may be a file which includes an OS, programs (ex.—executables), and data files which may be related to those programs. Further, the OS image may have a directory structure and/or some files in it.

In embodiments of the present disclosure, the boot appliance 106 may include (ex.—may contain) a plurality of hard disk drives (ex.—SATA hard disk drives) 108. In still further embodiments, the plurality of hard disk drives 108 of the boot appliance 106 may be configured into one or more RAID volumes 110. In further embodiments, each RAID volume may be divided into multiple partitions, such that each partition may serve as the boot drive for any server included in the plurality of servers 104 which is connected to it. In still further embodiments, the plurality of hard disk drives 108 of the boot appliance 106 may be configured for being replaceable without causing significant interruption to (ex.—without shutting down) the system 100, thereby eliminating downtime in the event of failure (and thereby reducing costs).

In exemplary embodiments of the present disclosure, the boot appliance 106 may be configured essentially as a plug-and-play device in that the RAID volume(s) 110 may be pre-configured. In further embodiments, the boot appliance 106 may include a controller board 112 (ex.—a System Bus Adapter (SBA) Controller Board). In still further embodiments, the controller board 112 of the boot appliance 106 may include a plurality of connectors (ex.—connections; connector ports) 114 for facilitating communicative coupling(s)/connection(s) (ex.—host/drive connections) between the boot appliance 106 and the plurality of servers 104. For instance, the plurality of connectors 114 may be configured for supporting any one or more of a variety of protocols, such as: Serial Attached Small Computer System Interface (SAS), SATA, Fibre Channel (FC), and/or Peripheral Component Interconnect Express (PCIe). In still further embodiments, one of the plurality of connectors 114 may be an Ethernet connector for facilitating an Ethernet connection between the boot appliance 106 and a monitoring system (ex.—a network management system; a remote management system) 116. For instance, the boot appliance 106 may be configured for providing its own environmental controls and may provide alerts indicating a status (ex.—functionality; health) of components of the system 100 and/or components of the boot appliance 106 via the Ethernet connection to the monitoring network management system 116. The network management system 116 may be configured for providing remote management via a Command-line Interface (CLI). Further, the Ethernet capabilities of the boot appliance 106 may allow for communication for desired configuration customization (ex.—system name, Dynamic Host Configuration Protocol (DHCP)/Static Internet Protocol (Static IP), Authorization/Authentication, etc.). Still further, the boot appliance 106 may be configured for supporting known Event Alert standards. Further, all environmental controls of the boot appliance 106 may be preset to meet established standards, thereby preventing the need for customization.

In embodiments of the present disclosure, the boot appliance 106 may include processing functionality (ex.—processing components). Further, the boot appliance 106 may include one or more protocol translation layers 118. The protocol translation layers 118 may be connected to the controller board 112 and may be communicatively coupled with the plurality of connectors 114. Further, the boot appliance 106 may be configured for operating in Target Mode in multiple protocols. The protocol translation layer(s) 118 may allow for communicative coupling between the disk drives (ex.—boot drives) 108, the boot appliance 106, the servers 104 and/or the monitoring system 116. Further, the boot appliance 106 may include one or more hardware and/or firmware layers (ex.—RAID hardware/firmware layers) 120, the hardware/firmware layer(s) 120 being connected to the controller board 112. The hardware/firmware layer(s) may be communicatively coupled with the protocol translation layer(s) 118 and may be communicatively coupled with the disk drives 108. The boot appliance 106 may be configured such that it may be presented to servers 104 (with which the boot appliance 106 is communicatively coupled) in a manner which makes the boot appliance 106 appear as an individual target to the servers 104.

In exemplary embodiments of the present disclosure, the boot appliance (ex.—boot device; SATA boot appliance) 106 is configured such that it is not limited by protocols on either the front end or back end. On the front end (ex.—external), the protocols implemented may be/may include SAS, SATA, Fibre Channel, and/or the like, while on the back end (ex.—end connected to the RAID volume(s)), the protocols implemented may be/may include SAS, SATA, PCIe, and/or the like. Further, the device 106 may be configured such that it is not limited by the number of servers 104 it can support. Still further, server support may only be limited by the number of outside server connections provided or the size of the partitions relative to the size of the RAID 1 volume provided. For instance, two terabyte (2 TB) drives with eighty gigabyte (80 GB) partitions in a RAID 1 configuration could support about twenty-four (24) servers.

In embodiments of the present disclosure, the drives 108 (and RAID volumes 110) of the system 100 may be hot-swappable to promote ease of serviceability and may promote improved reliability of the system 100. The boot appliance 106 of the present disclosure may be used in (but is not limited to use in) high-density server environments where both cost and reliability are at a premium. By using the boot device 106 of the present disclosure in a storage system 100, lower cost would be promoted over systems which require purchasing a boot drive for each server. Further, greater system reliability may be achieved through both RAID functionality and device component redundancy.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a firmware package and/or a software package. Such a firmware package and/or software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A data storage system, comprising:
   a plurality of servers;
   an enclosure, the enclosure configured for at least substantially containing the plurality of servers; and
   a boot appliance including a controller board and a plurality of connectors connected to the controller board, the boot appliance being communicatively coupled with the plurality of servers via the plurality of connectors, the boot appliance including a plurality of disk drives,
   wherein the boot appliance is configured for providing a boot drive and an operating system image to multiple servers included in the plurality of servers;
   wherein the boot appliance provides a Target Mode, wherein the Target Mode operates in multiple protocols; and
   wherein the boot appliance includes a protocol translation layer, the protocol translation layer being connected to the controller board, the protocol translation layer being communicatively coupled with the plurality of connectors.

2. A data storage system as claimed in claim 1, wherein the boot appliance includes a hardware/firmware layer, the hardware/firmware layer being connected to the controller board, the hardware/firmware layer being communicatively coupled with the disk drives and the protocol translation layer of the boot appliance.

3. A data storage system as claimed in claim 2, wherein a connector included in the plurality of connectors is configured for connecting the boot appliance to a remotely-located monitoring system.

4. A data storage system as claimed in claim 1, wherein the data storage system is a data center.

\* \* \* \* \*